United States Patent [19]

Okuyama et al.

[11] 4,024,079

[45] May 17, 1977

[54] METHOD OF PREPARING A CATALYST FOR TREATMENT OF EXHAUST GASES

[75] Inventors: Toshiki Okuyama, Ohiso; Sakae Kawagoshi; Tadashi Ikemi, both of Yokohama; Kiyomi Shimonuri, Yokosuka, all of Japan

[73] Assignee: Nissan Motor Co., Ltd., Yokohama, Japan

[22] Filed: Jan. 29, 1976

[21] Appl. No.: 653,604

[30] Foreign Application Priority Data

Jan. 30, 1975 Japan .............................. 50-11858

[52] U.S. Cl. ........................... 252/455 R; 252/463; 252/472; 423/213.5

[51] Int. Cl.² .................... B01J 21/04; B91J 21/12; B01J 23/40

[58] Field of Search ............. 252/439, 463, 466 PT, 252/472, 455 R; 423/213.5

[56] References Cited

UNITED STATES PATENTS

| 3,931,054 | 1/1976 | Lester | 252/466 PT |
| 3,972,829 | 8/1976 | Michalko | 252/466 PT |

*Primary Examiner*—W. J. Shine

[57] ABSTRACT

A catalyst is prepared by firstly impregnating a carrier with a solution of a catalytically active metal compound and a sulfur compound and thereafter treating the impregnated carrier in a stream of high temperature steam.

11 Claims, No Drawings

METHOD OF PREPARING A CATALYST FOR TREATMENT OF EXHAUST GASES

This invention relates to a method of preparing a catalyst for treating exhaust gases produced by combustion of hydrocarbon fuels.

The problem of air pollution is not a new one, but it has become aggravated in many cities in recent years. The air in most cities contains substantial quantities of the products of incomplete combustion of organic fuels which products are emited from automotive internal combustion engines. In order to remove harmful carbon monoxide and hydrocarbons of the products of the incomplete combustion, it is becoming conventional to convert catalytically the harmful components in presence of oxygen into harmful components into harmless ones. Accordingly, catalysts of high activity, long life and extreme durability are now strongly required for practical use. However, catalysts which meet such requirements are not common since the methods for preparing such high performance catalysts have not been developed until now.

We have now found that the above requirements are met by use of a catalyst which is prepared in accordance with the following method of the present invention a chemically substantially inert and catalytically substantially inactive refractory carrier is impregnated with a solution of at least one compound of a catalytically active metal and of at least one compound selected from the group consisting of ammonium thioglycolate, ammonium thiosulfate and sodium thiosulfate to produce a sulfur containing intermediate compound of the catalytically active metal to coat the carrier. Thereafter, the coated refractory carrier is treated in a stream of steam at a high temperature to decompose the intermediate coating compound and fix the catalytically active metal on the surface of the refractory carrier.

The refractory carrier consists of a material such as any known sinterable ceramic material which includes alumina, cordierite etc. The refractory carrier is used in a variety of forms such as for example, pellets, spheres or monolithic honeycomb structures which may be coated with alumina, particularly γ-alumina particles.

The compound of catalytically active metal used in this invention may be a conventional compound of a precious metal such as, for example, chloroplatinic acid $H_2PtCl_6 \cdot 6H_2O$, palladium chloride $PdCl_2 \cdot 2H_2O$, palladium nitrate $Pd(NO_3)_2$, rhodium nitrate $Rh(NO_3)_3$, rhodium chloride $RhCl_3$ or ruthenium chloride $RuCl_3$, or another metal which is conventionally used for similar purposes. While only chloroplatinic acid which is highly active as a widely used oxidation catalyst is described hereinafter, it is to be understood that the compound of a catalytically active metal is not limited only to chloroplatinic acid and that other similar compounds can be used for this purpose.

In the method according to the present invention, a predetermined amount of chloroplatinic acid is weighed and dissolved in a measured amount of a suitable solvent such as water to produce a solution thereof. Into the solution, at least one compound selected from the group consisting of ammonium thioglycolate $HSCH_2COONH_4$, ammonium thiosulfate $(NH_4)_2S_2O_3$ and sodium thiosulfate $Na_2S_2O_3$ is added so that the ratio in gram atom of platinum in the chloroplatinic acid to sulfur in the above sulfur containing compound is in the range of from 1:1 to 1:20, preferably from 1:2 to 1:6. The refractory carrier is thereafter immersed into the solution containing the chloroplatinic acid and the compound of the group, in which the compounds react with each other to form a sulfur containing intermediate compound of platinum. The surface of the refractory carrier is impregnated and coated with the intermediate sulfur compound. The coating of the carrier with the intermediate compound may be achieved in a different manner in which the carrier is is firstly impregnated either with a solution of the chloroplatinic acid or a solution of a selected compound of the group and thereafter impregnated with the other to form the coating of the intermediate compound on the surface of the carrier. It will be understood that any other suitable manner may be used to form and coat the intermediate compound on the carrier.

With respect to the above-mentioned ratio in gram atom of platinum (catalytically active metal) to sulfur: when the ratio is 1:less than 1, only few of the compounds of platinum can be formed into the sulfur containing intermediate compound. On the contrary, when the ratio is 1:more than 20, too little platinum is coated and fixed to the surface of the carrier and conversely too much sulfur for practical use is left on the surface of the carrier. Accordingly, an economic problem arises in which a great deal of the solution of the compound of the group is consumed for obtaining such a ratio of platinum to sulfur. It is found that the preferable ratio is in the range of from 1:1 to 1:6 for the other catalytically active metals such as palladium and ruthenium. Although the actual form or state of the sulfur containing intermediate compound is still not clear, it seems to be present in the form of complexes, sulfides or sulfates formed by means of coordinate bonds.

The refractory carrier thus coated with the sulfur containing intermediate compound of platinum is thereafter heat-treated at a high temperature to decompose it and fix the metallic platinum (catalytically active metal) onto the surface of the carrier. The high temperature treatment in this instance is accomplished by heating the coated refractory carrier in the stream of high temperature steam, which step is novel in the art though it is conventional to heat-treat a refractory carrier impregnated with a solution containing catalytically active metal or metals in a stream of air or hydrogen gas at a high temperature. The heat-treatment in this instance is carried out by heating the coated refractory carrier in the stream of so-called superheated steam having a temperature ranging from 300° C to 600° C or by heating the coating on the surface of the carrier at a temperature from 300° C to 600° C by any suitable heating means in the stream of steam. In order to accomplish more effective heat treatment or satisfactory decomposition of the coating, the volume of steam used for this heat treatment is found preferably to be in the range of from 1 to 20 times as much as the volume of the refractory carrier when the steam is converted to water in liquid state at 25° C. Furthermore, it is preferably to treat the coated carrier with the amount of steam corresponding to the above-mentioned volume of the liquid water for a time ranging from 20 minutes to 3 hours.

The above-mentioned temperature range of heat treatment is experimentally determined by the following reasons: when treated at a temperature lower than the lower limit of 300° C, the resulting catalyst gives unsatisfactory catalytic effect which seems to result from incomplete decomposition of the sulfur containing intermediate compound of platinum. Also when treated at a temperature higher than the upper limit of 600° C, the resulting catalyst gives unsatisfactory catalytic effect which seems to result from the deterioration of dispersion of the metallic platinum on the surface of the carrier although the decomposition of the intermediate compound is considerably rapid.

The amount (volume) of the steam used for the above-mentioned heat treatment affects the sulfur content (and clorine content when chloroplatinic acid is used) in the resulting catalyst. As is apparent from the foregoing, the heat-treatment is achieved by heating the coated carrier for 3 hours even with the steam volume equivalent to the volume of the carrier. Additionally, it is also possible to vary the amount of the steam, the treating time and the treating temperature within the above-mentioned ranges, and to select the optimum conditions of the heat-treatment in accordance with the configuration of apparatus therefor and other conditions. In any case, it is recommended to select the heat-treatment conditions at which only a low sulfur content in the resulting catalyst is detected by chemical analysis, and economic advantages are obtained.

The following examples, while in no way intended to limit the scope of the invention, will aid in the understanding of this invention.

EXAMPLE 1

2.4 liters of an aqueous solution of chloroplatinic acid containing 4 grams of platinum was first prepared, and then sodium thiosulfate was added thereinto in a calculated amount by which the gram ratio of platinum to sulfur was 1:2. Thereafter, the aqueous solution was diluted with water to 2.8 liters. Into this aqueous solution, 6 liters of commercially available spherical carriers made of activated alumina were immersed in the aqueous solution for as long as 30 minutes to uniformly impregnate all of the carriers with the aqueous solution. In this example, the spherical carriers are 3 mm in the average diameter and have such an absorption ability that 1 liter of the carrier absorbs 400 ml of the aqueous solution.

The carriers thus impregnated were drained and thereafter dried with heated air till their water content was decreased to 5%. The dried impregnated carriers were then heated in a stream of steam for 3 hours being maintained at 450° C. The steam used for this heat-treatment measured about 4 liters as condensed water at room temperature when the steam was cooled and condensed by a heat exchanger and collected as liquid water. The resulting catalyst carried 0.8 grams of platinum per 1 liter of the carriers.

EXAMPLE 2

2.4 liters of an aqueous solution of chloroplatinic acid containing 4 grams of platinum was first prepared, and then ammonium thiosulfate was added thereinto in a calculated amount by which the gram atom ratio of platinum to sulfur was 1:6. Thereafter, the aqueous solution was diluted with water to 3.6 liters. Into this aqueous solution, 4 liters of commercially available spherical carriers of activated alumina (same kind as used in Example 1) were immersed in the aqueous solution for as long as 1 hour to uniformly impregnate all the carriers with the aqueous solution.

The thus impregnated carriers were drained and thereafter dried with heated air. The dried impregnated carriers were heated in a stream of steam for about 1 hour being maintained at 500° C. The steam used for this heat-treatment measured 60 liters when condensed into liquid water. The resulting catalyst carried 0.83 grams of platinum per 1 liter of the carriers.

EXAMPLE 3

1.6 liters of an aqueous solution of chloroplatinic acid containing 4 grams of platinum was first prepared and then ammonium thioglycolate was added thereinto in a calculated amount by which the gram atom ratio of platinum to sulfur was 1:2. Thereafter, the aqueous solution was diluted with water to 2.4 liters. This aqueous solution was sprayed onto the surfaces of the spherical carriers of activted alumina (same kind as used in Example 1) and then the sprayed carriers were allowed to stand for 1 hour to uniformly impregnate the carriers with the aqueous solution. The thus impregnated carriers were drained and dried with heated air till their water content was decreased to 7%, and thereafter heated at 600° C for 75 minutes in a stream of steam. The used steam measured about 40 liters when condensed into water at 25° C. The resulting catalyst carried 0.78 grams of platinum per 1 liter of the carriers.

EXAMPLE 4

2.6 liters of an aqueous solution of chloroplatinic acid containing 1.4 grams of platinum was first prepared, and then sodium thiosulfate was added thereinto in a calculated amount by which the gram atom ratio of platinum to sulfur was 1:4. The aqueous solution was then diluted with water to 2.8 liters. Into this solution, an activated alumina-coated monolithic carrier having 600 ml of apparent volume was gradually immersed and allowed to stand for 2 hours. In this example, the monolithic carrier was made of cordierite and in the shape of a honeycomb in section. After the carrier was taken out from the aqueous solution and dried, it was heated at 500° C for 2 hours by using steam in the amount of 3.6 liters when converted into water at 25° C. The resulting catalyst carried 1.2 grams of platinum.

The following comparative examples are shown to provide reference catalyst for comparision with the catalysts prepared in accordance with the present invention.

COMPARATIVE EXAMPLE 1

3 liters of the same kind of spherical carriers as set forth in Example 1 were immersed and dried at the same conditions as in Example 1. Then the total amount of the dried carriers was divided into 6 parts and the respective parts were heat-treated in a stream of hydrogen gas at temperatures ranging from 300° C to 600° C. As a result of performance evaluation test, the part treated at 500° C for 3 hours was recognized to be the best and referred to as the catalyst according to Comparative Example 1. The catalyst carried 0.8 grams of platinum per liter of the carriers.

COMPARATIVE EXAMPLE 2

3 liters of the same kind of spherical carriers as set forth in Example 1 were impregnated and dried under the same conditions as in Example 1. The dried carriers were divided into several parts and each heat-treated in a stream of air under different conditions. As a result of performance evaluation tests, it was recognized that the part treated at 550° C for 3 hours was the best, which was in agreement with data already obtained. This catalyst referred to as Comparative Example 2 carried 0.80 grams of platinum per 1 liter of carriers.

COMPARATIVE EXAMPLE 3

3 liters of the same kind of carriers as set forth in Example 2 were impregnated and dried under the same conditions as in Example 2. Then the dried carriers were heat treated in a stream of hydrogen gas at 500° C for 3 hours which had been known to be the best in consideration of data already obtained. The resulting catalyst referred to as Comparative Example 3 carried 0.83 grams of platinum per 1 liter of the carriers.

COMPARATIVE EXAMPLE 4

3 liters of the same kind of carriers as set forth in Example 2 were impregnated under the same conditions as in Example 2 and thereafter were heat-treated in a stream of air at 500° C for 3 hours which had been known the best in consideration of data already obtained. The resulting catalyst referred to as Comparative Example 4 carried 0.83 grams of platinum per 1 liter of the carrier.

COMPARATIVE EXAMPLE 5

3 liters of the same kind of the carriers set forth in Example 3 were impregnated under the same conditions as in Example 3 and thereafter were heat-treated in a stream of hydrogen gas at 500° C for 3 hours which condition had been known to give the best performance of the resulting catalyst. The resulting catalyst referred to as Comparative Example 5 carried 0.78 grams of platinum per 1 liter of the carriers.

COMPARATIVE EXAMPLE 6

3 liters of the same kind of spherical carriers as set forth in Example 3 were impregnated under the same conditions as in Example 3 and thereafter were heat-treated in a stream of air at 500° C for 3 hours which condition had been known to give the best performance of the resulting catalyst. The resulting catalyst referred to as Comparative Example 6 carried 0.78 grams of platinum per 1 liter of the carrier.

COMPARATIVE EXAMPLE 7

The same kind of a monolithic carrier as set forth in Example 4 was impregnated and dried under the same conditions as in Example 4. Thereafter, the dried carrier was heat treated in a stream of hydrogen gas at 500° C for 3 hours which condition had been known to give the best performance of the resulting catalyst. The resulting catalyst referred to as Comparative Example 7 carried 1.2 grams of platinum per 1 liter of the carrier.

COMPARATIVE EXAMPLE 8

The same kind of a monolithic carrier as set forth in Example 4 was impregnated and dried under the same conditions as in Example 4 and thereafter heat-treated in a stream of air at 500° C for 3 hours. This condition has been known to give the best performance of the resulting catalyst in consideration of data already obtained. The resulting catalyst referred to as Comparative Example 8 carried 1.2 grams of platinum.

COMPARATIVE EXAMPLE 9

1 liter of carriers of same kind as set forth in Example 1 was immersed into 700 ml of an aqueous solution of chloroplatinic acid containing 1 gram of platinum for 30 minutes to uniformly impregnate the carriers with the solution. After the impregnated carriers were drained and dried, the carriers were divided into three parts i.e. a part of 400 ml, a part of 300 ml and a part of 300 ml which are referred to as part A, part B and part C, respectively.

Thereafter, the part A was heat-treated in a stream of steam at 450° C for 3 hours using the steam amount of 15 liters per 1 liter of the carriers when converted into liquid water. The resulting catalyst is referred to as Comparative Example 9-A. The treatment condition has been considered to give the best performance of the resulting catalyst. The parts B and C were respectively heat-treated in a stream of hydrogen at 550° C for 3 hours and in a stream of air at 550° C for 3 hours, and the resulting catalysts referred to as Comparative Examples 9-B and 9-C, respectively. All of the three kinds of the resulting catalyst carried 0.9 grams per 1 liter of the carriers since the three kinds of carriers were impregnated under the same conditions.

COMPARATIVE EXAMPLE 10

Spherical carriers of the same kind as set forth in Example 1 were impregnated and dried in the same manner as in Comparative Example 9 to obtain impregnated carriers having a water content of 10%. Thereafter, the impregnated carriers were set in a reaction chamber and then a mixture of gases was passed for 40 minutes into the reaction chamber to react with the material coated on the surfaces of the carriers, which mixture of gases had been prepared by mixing 0.15 liters per minute of hydrogen sulfide gas, 1.60 liters per minute of air and 5 liters per minute of nitrogen gas. After being taken out from the reaction chamber, the impregnated carriers were divided into three parts, i.e. parts A, B and C. The part A was heat-treated in a stream of steam at 450° C for 3 hours using the steam amount of 5 liters per 1 liter of the carriers when converted into liquid water. The part B was heat-treated in a stream of hydrogen gas at 500° C for 3 hours. The part C was heat-treated in a stream of air at 500° C for 3 hours. The above treatment conditions for the respective parts were selected so that the resulting catalysts would exhibit the best performances as to their respective treating manners. The resulting catalysts which had been prepared by heat-treating the parts A, B and C were referred respectively to as Comparative Examples 10-A, 10-B and 10-C. All of the resulting catalysts carried 0.91 grams of platinum per 1 liter of the spherical carriers.

EVALUATION OF ACTIVITY PERFORMANCE

The catalysts obtained in Examples 1 to 3 and Comparative Examples 1 to 6, 9 and 10 were poured into respective reaction cylinders of a bench apparatus having inner diameters of 30 mm. Thereafter, a synthetic gas mixture having a composition as shown in Table 1 was passed through the catalyst at a space velocity of 30000 hr$^{-1}$ (volume hourly space velocity, VHSV) and then conversion (%) of carbon monoxide and hydrocarbon (propane) was measured at inlet gas temperatures of 300° C and 400° C in the reaction cylinder.

The conversion (%) was calcinated according to the following equation:

$$\text{Conversion (\%)} = \frac{C_B - C_A}{C_B} \times 100$$

where,
$C_B$: the concentration of a composition gas before passing through the catalyst
$C_A$: the concentration of a composition gas after passing through the catalyst It is to be understood that the low temperature activity of the catalyst is higher as the conversion (%) thereof is higher at predetermined temperatures of as low as from 300° C to 400° C.

With respect to the catalysts (using monolithic carrier) in Example 4 and Comparative Examples 7 and 8, they were cut into the shape of a cylinder having a diameter of 29 mm and thereafter the cylindrical surfaces thereof were covered with a quartz cloth to prevent gas leaks. Then, the cylindrical catalysts were set in a reaction cylinder having a diameter of 30 mm and the conversion (%) was measured in the same manner as mentioned above.

Table 1

| Composition | | Content |
|---|---|---|
| Carbon monoxide | CO | 2% |
| Propane | $C_3H_8$ | 500 ppm |
| Nitric oxide | NO | 1000 ppm |
| Oxygen | $O_2$ | 2.5% |
| Carbon monoxide | $CO_2$ | 12% |
| Water | $H_2O$ | 10% |
| Nitrogen | $N_2$ | balance |

The measured conversion (%) by the catalysts according to all the Examples and Comparative Examples are shown in Table 2 below.

Table 2

| Catalyst Item | Temp. Gas | Conversion (%) 300° C $C_3H_8$ | CO | 400° C $C_3H_8$ | CO | Amount of Carried platinum |
|---|---|---|---|---|---|---|
| Example | 1 | 79 | 100 | 91.5 | 100 | 0.80g/liter of carriers |
|  | 2 | 80 | 100 | 93 | 100 | 0.83g/liter of carriers |
|  | 3 | 81.5 | 100 | 92.5 | 100 | 0.78g/liter of carriers |
|  | 4 | 83 | 100 | 98 | 100 | 1.2g/600ml monolith |
| Comparative Example | 1 | 60 | 100 | 85 | 100 | 0.80g/liter of carriers |
|  | 2 | 71 | 100 | 90 | 100 | 0.80g/liter of carriers |
|  | 3 | 63 | 100 | 85 | 100 | 0.83g/liter of carriers |
|  | 4 | 68 | 100 | 89 | 100 | 0.83g/liter of carriers |
|  | 5 | 62 | 100 | 84 | 100 | 0.78g/liter of carriers |
|  | 6 | 66 | 100 | 88 | 100 | 0.78g/liter of carriers |
|  | 7 | 70 | 100 | 90 | 100 | 1.2g/600ml monolith |
|  | 8 | 79 | 100 | 98 | 100 | 1.2g/600ml monolith |
|  | 9-A | 62 | 98 | 84 | 100 | 0.90g/liter of carriers |
|  | 9-B | 58 | 98 | 78 | 100 | 0.90g/liter of carriers |
|  | 9-C | 43 | 96 | 71 | 98 | 0.90g/liter of carriers |
|  | 10-A | 66 | 100 | 84 | 100 | 0.91g/liter of carriers |
|  | 10-B | 60 | 99 | 80 | 100 | 0.91g/liter of carriers |
|  | 10-C | 65 | 98 | 88 | 100 | 0.91g/liter of carriers |

As is apparent from Table 2, the catalysts prepared by the process according to the present invention exhibit markedly high activity, of course, compared with the catalysts prepared by processes different from the present invention, and even compared with the catalysts prepared by processes including therein either one of the steps of forming a coating of a sulfur containing intermediate compound of a catalytically active metal on the surface of the carrier and heat-treating the coated carrier in a stream of steam both of which are important features of the present invention. Therefore, it will be understood that the present invention greatly contributes to increase the activities of catalysts which are used for treating exhaust gases emitted from internal combustion engines.

It is to be noted that, according to the present invention, it is possible for the catalyst carrying a relatively small amount of catalytically active metal to exhibit relatively high activity and therefore it is not required to increase the carried amount of the active metal for the purpose of increasing the activity of the catalyst compared with the catalysts by conventional processes.

As the catalyst according to Comparative Example 10-A was prepared by a process relatively similar to that of the present invention which process includes a step of treating with a mixture gas containing hydrogen sulfide ($H_2S$) gas and air to form a sulfur containing intermediate compound of a catalytically active metal and a step of heat-treating the carrier coated with the intermediate compound in a stream of steam, it seems to exhibit relatively good activity in a group of the catalysts according to the Comparative Examples. However, the catalyst preparing process according to Comparative Example 10-A requires and consumes a large amount of toxic and expensive hydrogen sulfide gas inviting danger and high cost in the process and therefore it has faced economical and technical problems as well as environmental pollution problems.

It is also to be noted that the data of conversion (%) measured should be compared between those of similar shape of carriers because the conversion (%) depends to a considerable extent on the shape of the carrier, for example monolithic, spherical or pellel type.

EVALUATION OF DURABILITY PERFORMANCE

The catalysts according to Examples 1 to 3 and Comparative Examples 1 to 6, 9 and 10 were respectively poured in catalyst containers. Six of the catalyst containers were set in a test converter, in which the six catalysts were selected to include therein at least two catalysts according to Examples. On the other hand, the catalysts using monolithic carrier according to Example 4 and Comparative Examples 7 and 8 were respectively set in test converters so that the pressure differentials of the test converters were equivalent to each others.

Two of the test converters were respectively connected to two banks of a V-8 type engine having a displacement of 4414 cc, the output shaft of the engine being connected to a widely used dynamometer to load the engine. The engine was powered by leadless gasoline using lubricating oil containing little impurities, and cyclically driven through modes of operation including acceleration, normal cruising, deceleration and idling under conditions analogous to the durability standards established by AMA (Automotive Manufacturers' Association, United States of America).

Evaluation of the durability was carried out as follows: with respect to the catalysts of spherical type, 30 mls of the catalysts were twice sampled from the catalyst container to measure the conversion (%) in the same manner as in Evaluation of Activity Performances when the time of engine operation reached predetermined levels which correspond to 12500 miles and 2500 miles actual run. With respect to the catalysts of monolithic type, the sampling of the catalysts for the same purpose was carried out only when the time of the engine operation reached the level corresponding to 25000 miles actual run.

The following Table 3 shows the data of conversion (%) at an inlet gas temperature of 400° C in the reaction cylinder. It is apparent from Table 3 that the catalysts prepared by the method according to the present invention are excellent not only in initial performance but also in durability compared with the catalysts prepared by other processes.

Table 3

| Catalyst | Item | Mileage | $C_nH_n$ conversion (%) 0 | 12500 | 25000 | CO conversion (%) 0 | 12500 | 25000 |
|---|---|---|---|---|---|---|---|---|
| Example | 1 | | 91.5 | 86 | 79 | 100 | 100 | 100 |
| | 2 | | 93 | 84 | 80 | 100 | 100 | 100 |
| | 3 | | 92.5 | 85 | 77 | 100 | 100 | 100 |
| | 4 | | 98 | — | 78 | 100 | — | 100 |
| Comparative Example | 1 | | 85 | 80 | 75 | 100 | 100 | 100 |
| | 2 | | 90 | 82 | 76 | 100 | 100 | 100 |
| | 3 | | 85 | 81 | 74 | 100 | 100 | 100 |
| | 4 | | 89 | 80 | 74 | 100 | 100 | 100 |
| | 5 | | 84 | 70 | 68 | 100 | 100 | 99.5 |
| | 6 | | 88 | 73 | 70 | 100 | 100 | 100 |
| | 7 | | 90 | — | 76 | 100 | — | 100 |
| | 8 | | 98 | — | 74 | 100 | — | 100 |
| | 9-A | | 84 | 69 | 63 | 100 | 100 | 100 |
| | 9-B | | 78 | 68 | 59 | 100 | 100 | 98 |
| | 9-C | | 71 | 48 | 27 | 100 | 92 | 70 |
| | 10-A | | 84 | 74 | 69 | 100 | 100 | 100 |
| | 10-B | | 80 | 73 | 67 | 100 | 100 | 99.5 |
| | 10-C | | 88 | 72 | 68 | 100 | 100 | 100 |

What is claimed is:

1. A method of preparing a catalyst for treating exhaust gases produced by combustion of hydrocarbon fuel, comprising:

coating a substantially chemically inert and substantially catalytically inactive refractory carrier with a liquid containing a sulfur-containing compound of at least one catalytically active metal, said sulfur-containing compound being produced by mixing and reacting in a solvent at least one compound of catalytically active metal and at least one compound selected from the group consisting of ammonium thioglycolate, ammonium thiosulfate and sodium thiosulfate so that the gram atom ratio of the catalytically active metal to the sulfur in the compound thereof is in the range from 1:1 to 1:20;

drying said carrier coated with said sulfur-containing compound of at least one catalytically active metal; and heat-treating the dried coated carrier in a stream of steam at a temperature ranging from 300° C to 600° C to decompose the compound and fix the catalytically active metal on the surface of the carrier.

2. A method as claimed in claim 1, in which the solvent in the coating step is water.

3. A method as claimed in claim 1, in which the catalytically active metal is selected from the group consisting of Pt, Pd, Rh, and Ru.

4. A method as claimed in claim 1, in which the refractory carrier is made of ceramic material.

5. A method as claimed in claim 4, in which the ceramic material is selected from the group consisting of alumina and cordierite.

6. A method as claimed in claim 4, in which the refractory carrier is of spherical type.

7. A method as claimed in claim 4, in which the refractory carrier is a monolith of honeycomb shape.

8. A method as claimed in claim 2, in which the monolith is coated with activated alumina.

9. A method as claimed in claim 1, in which the gram atom ratio is in the range from 1:2 to 1:6.

10. A method as claimed in claim 1, in which the heat-treating step is carried out by use of the steam in the amount ranging from 1 to 20 times as much as the volume of the carrier when converted to liquid water at 25° C.

11. A method as claimed in claim 1, in which the heat-treating step is carried out for a time ranging from 20 minutes to 3 hours.

* * * * *